United States Patent [19]

Wagner

[11] Patent Number: 4,539,045

[45] Date of Patent: * Sep. 3, 1985

[54] NON-BLOOMING FIRE RETARDANTS FOR WOOD SUBSTRATES

[75] Inventor: George M. Wagner, Lewiston, N.Y.

[73] Assignee: Occidental Chemical Corporation, Niagara Falls, N.Y.

[*] Notice: The portion of the term of this patent subsequent to May 17, 2000 has been disclaimed.

[21] Appl. No.: 562,373

[22] Filed: Dec. 16, 1983

Related U.S. Application Data

[63] Continuation-in-part of Ser. No. 340,923, Jan. 20, 1982.

[51] Int. Cl.³ .................................................. C09D 5/18
[52] U.S. Cl. ................................ 106/18.13; 106/18.15; 106/18.18; 427/397; 428/921
[58] Field of Search ................. 106/18.13, 18.15, 18.18

[56] References Cited

U.S. PATENT DOCUMENTS

| | | | |
|---|---|---|---|
| 2,526,083 | 10/1950 | Nielsen | 106/18.13 |
| 3,900,327 | 8/1975 | Miller | 106/18.17 |
| 4,247,332 | 1/1981 | Kinoshita et al. | 106/18.13 |
| 4,383,858 | 5/1983 | Wagner | 106/18.14 |

FOREIGN PATENT DOCUMENTS 658107  10/1951  United Kingdom ............. 106/18.13

*Primary Examiner*—Lorenzo B. Hayes
*Attorney, Agent, or Firm*—James F. Tao; William G. Gosz

[57] ABSTRACT

Non-blooming fire retardant compositions are disclosed comprising an ammonium phosphate-containing fire retardant and an effective amount of boric acid or an alkali metal borate. The ammonium phosphate-containing fire retardant preferably comprises the reaction mixture of aqueous phosphoric acid and an alkylene oxide. Preferably, the boric acid or alkali metal borate is present in an amount of from about 2.5% to about 12% by weight of solids in the phosphate-containing fire retardant. Such compositions are less susceptible to exudation of the fire retardant from treated wood panels during drying of the panels at elevated temperatures, and are particularly suitable for use in continuous treatment processes.

13 Claims, No Drawings

NON-BLOOMING FIRE RETARDANTS FOR WOOD SUBSTRATES

CROSS REFERENCE TO RELATED APPLICATION

This application is a continuation-in-part of application Ser. No. 340,923, filed Jan. 20, 1982.

BACKGROUND OF THE INVENTION

Cellulosic material, such as paper, wood, rayon and cotton are highly flammable substances and when ignited, the fire spreads rapidly. Many methods for retarding the spread of such fires are known, but for many commercial uses, such methods are often too costly or ineffective or render the physical characteristics of the flame retarding product undesirable.

Cellulosic materials used throughout the industry and the home are closely associated with humans. Consequently, methods of chemically treating them to resist burning must assure a safe living environment and preserve their aesthetic qualities, particularly when the product is wood. The use of volatile or harmful solvents should be minimized during the process for treating the product with a chemical flame retarding agent, especially when a residue of such a solvent would exude from the processed material. The chemical treatment also should not produce or leach toxic or ugly deposits onto the surface of the material and must also maintain the aesthetic qualities of the material through the broad range of environmental conditions it may be subjected to.

Chemical methods for flame retarding treatment of ligno cellulosic material, such as plywood panels, furniture wood, cardboard, paper and the like, include the application of salts of phosphoric acid, boric acid, sulfamic acid and the like as well as various organic compounds in most instances in organic solvent systems. These methods are economically attractive but cause crystallization of salts on the surfaces of the treated wooden product after drying, and cause the migration of undesirable chemicals to the surfaces. In addition to these difficulties, the solvents used are volatile during the application of the flame retardants and exude from the finished product.

Ammonium phosphates are among the more effective inorganic fire retardants which are commonly used to treat cellulosic material. Such phosphates are typically present as diammonium phosphate, monoammonium phosphate, or simple or complex mixtures of such phosphates. Particularly suitable fire retardants of this variety are prepared by reacting aqueous phosphoric acid with an alkylene oxide, such as ethylene oxide, propylene oxide or butylene oxide. See U.S. Pat. No. 3,900,327, exemplifies such fire retardants formed by reacting 0.5 to 1.5 parts of ethylene oxide by weight of orthophosphoric acid. An improved fire retardant of this variety is disclosed in U.S. Pat. No. 4,383,858 wherein an alkylene oxide of 2 to 4 carbon atoms is reacted with aqueous phosphoric acid, with the weight ratio of oxide to acid being in the range of from about 0.01:1 to about 0.25:1.

Commercial processes for treating wood panels involve the use of automated high speed equipment which subject the panels to consecutive treatment processes. The fire retardant material is usually applied to the panels in one of these treatment processes. During the application process, the panel surface is covered with an appropriate quantity of fire retardant in liquid form. Application methods generally include spraying, immersion, flooding, bath purging, drip flushing, batch and continuous processing through tanks, dips or through sprays, by wick or absorptive fiber treatment or by other similar known methods. In a typical process for treating wood panels, 4 feet×8 feet sheets of plywood on a high speed assembly line are preheated to a temperature of about 40° C. to 150° C. and the top surfaces are over-sprayed or coated with fire retardant using a wick or absorptive fiber method or a spray stream, mist, drip or surface sheet dip method. Excess composition is removed from the surfaces after intimate contact for at least about one to three seconds. The plywood is then subjected to a drying cycle which dries the panels in a hot oven in a few seconds. The dried panels are then sanded in a continuous operation.

During the drying cycle, the surface temperature of the panels can reach 220° F. to 230° F. or more. Temperatures of this magnitude have the undesirable effect of causing the fire retardant material to exude from the surface of the panels, forming salt deposits which in turn form blisters as water is vaporized from the interior of the panels. Not only does this result in the loss of significant amounts of fire retardant, but the surface salts cause clogging of the sandpaper which must then be periodically cleaned requiring stoppage of the assembly line. The alternative of wet-stacking the panels to dry overnight is not a cost effective procedure.

It is therefore a principal object of the present invention to provide an improved ammonium phosphate-containing fire retardant composition which is less prone to exudation from the treated wood panels during continuous treatment processes.

SUMMARY OF THE INVENTION

In accordance with this and other objects of the present invention, an improved non-blooming fire retardant composition for cellulosic material comprises an ammonium phosphate-containing fire retardant and an effective amount of boric acid or an alkali metal borate.

The boric acid or alkali metal borate component is preferably present in the composition in an amount of from about 2.5% to about 12%, most preferably from about 5% to about 7.5%, by weight of solids in the phosphate-containing fire retardant solution.

The phosphate-containing fire retardant is a diammonium or monoammonium phosphate-containing material, or a material containing a simple or complex mixture of these phosphates. A preferred fire retardant is advantageously prepared by reacting aqueous phosphoric acid with an alkylene oxide of 2 to 4 carbon atoms, the weight ratio of oxide to acid being in the range of from about 0.01:1 to about 0.25:1. The fire retardant is generally an aqueous solution with a solids content of about 40%.

The cellulosic material is typically a ligno cellulosic material or a wood product, such as plywood which is unfinished, finished, photoprinted, coated or otherwise treated, finished wood, hard and soft wood for structural or furnishing use, veneered wood or other wood products of a solid or composite structure. For these wood products, it is preferred to apply an amount of fire retardant composition to the surface of the wood which will deliver at least about 8 grams of phosphorus per square meter of surface area.

The fire retardant composition of the present invention is particularly suitable for application to wood panels in continuous treatment processes where the drying cycle is completed in a relatively short time. In such treatment processes, the fire retardant compositions of this invention are less prone to exude from the panel surface.

DETAILED DESCRIPTION OF THE INVENTION

The fire retardant composition of the present invention comprises an ammonium phosphate-containing fire retardant and an effective amount of boric acid or an alkali metal borate. It has been found that excessive amounts of boron compound tend to cause a sticky or gummy surface on the wood panel. Therefore, an "effective amount" in the context of the present invention means an amount of boron compound which is sufficient to prevent the formation of salts or blisters on the surface of the panel, but less than the amount which would result in a sticky or gummy surface. Preferably, the boron compound is present in the range of from about 2.5% to about 12%, and most preferably from about 5% to about 7.5% by weight of solids in the phosphate-containing fire retardant. The preferred alkali metal borate is sodium borate.

The ammonium phosphate-containing fire retardant is specifically a diammonium or monoammonium phosphate-containing material, or a material containing a simple or complex mixture of these phosphates. A preferred phosphate-containing fire retardant comprises the reaction mixture formed from aqueous phosphoric acid and an alkylene oxide of 2 to 4 carbon atoms, the weight ratio of oxide to acid being in the range of from about 0.01:1 to about 0.25:1. Preferred reaction ingredients include orthophosphoric acid and propylene oxide or butylene oxide. Other details concerning the preparation of this fire retardant, additional preferred embodiments, methods of application, and physical and chemical properties are disclosed in U.S. Pat. No. 4,383,858, issued May 17, 1983, the disclosure of which is incorporated herein by reference.

In general, the fire retardant is prepared by adding an alkylene oxide to an aqueous solution of phosphoric acid. The phosphoric acid can be used in any of the known forms which are commercially available, however, a minor amount of water in solution with the phosphoric acid, i.e. 15% or more, is necessary in order to produce the proper reaction mixture. The aqueous solution of acid is placed in an appropriate reactor equipped with a stirring or agitating means and the alkylene oxide is bubbled as a gas or dripped as a liquid into the solution under neat conditions as is appropriate for the physical state of the oxide at room temperature and pressure. The exothermic reaction may be controlled by external cooling of the reactor vessel and by employing a cold water, brine or dry ice condenser as is appropriate. The weight increase of the solution resulting from the addition of the oxide is monitored so as to produce a final weight ratio within the limits set forth above. Other appropriate means of measuring the amount of oxide added may also be used. These would include volumetric measurements, weight loss measurements and the like. The temperature of the reaction is maintained within about 0° to about 100° C. at all times during the reaction; preferably, the reaction temperature is held within a range of about 10° C. to about 80° C. After addition of the oxide is complete, the reaction is allowed to stir until exothermicity ceases. The reaction then or shortly thereafter is substantially complete.

The composition thus formed is a complex reaction mixture of several condensation and hydrolysis products and phosphate derivatives of the alkylene oxide as well as inorganic phosphate compounds. The products in the reaction mixture include organophosphate mono-, di- and triesters, phosphoric acid, its salts and higher order congeners, water and the hydrolysis and condensation products produced by reaction of the alkylene oxide in acidic aqueous media.

Although a particular variety of ammonium phosphate-containing fire retardant has been described in detail above, it should be appreciated that other ammonium phosphate materials having varying degrees of effectiveness are also within the scope of the present invention. Such compositions are well known in the art and are readily available on a commercial basis.

The mixture of fire retardant and boron compound can be used directly as a fire retarding composition, or the mixture can include other ingredients such as ammonium hydroxide or organic amines, such as methyl amine, ethylamine, ethylene diamine, triethyl amine, tetraethylene diamine and the like. Preferred neutralizing ingredients include ammonia and ammonium hydroxide. In general, the reaction mixture may be used in concentrated form or may be diluted with water before or after neutralization as would be appropriate in order to produce a composition having a concentration which will deliver a desired effective amount of the composition to the cellulosic material treated under the particular application method and conditions employed. Typically, sufficient water is added to produce a solution having a solids content of about 40%.

The fire retardant composition can then be applied to cellulosic material in a known manner. It is particularly advantageous to use the compositions of this invention in commercial high speed treatment processes. In such processes, sheets of plywood such as luaun plywood are preheated to a temperature of about 40° C. to about 150° C., and the top surfaces are over-sprayed or coated with sufficient composition to impart the desired fire retardancy (generally at least about 8 grams of phosphorus per square meter of plywood is required) using known methods. Excess composition is removed from the surface after intimate contact for at least about one to three seconds. The plywood is then dried in a drying cycle which heats the surface of the plywood to about 220° F. to 230° F. for a few seconds. Normally, drying the plywood under these conditions causes the plywood to exude fire retardant salts and other chemicals. Such salt deposits form blisters on the surface as water is vaporized from the interior of the plywood. Surprisingly, however, the fire retardant compositions of the present invention do not exude from the surface of the plywood under conditions even more severe than the normal drying cycle. This effect is achieved by using only a small quantity of boron compound as an additive. Without being bound to any theory of operability, it is speculated that this phenomonon is due to the ability of the boron compounds to prevent crystallization of fire retardant salts. Instead, as water evaporates, a liquid is formed on the surface which soaks into the wood rather than solidifying. This prevents the loss of fire retardant chemicals and avoids clogging of continuous sanding equipment which is normally used following the drying cycle.

The following examples further illustrate some embodiments and some of the features and characteristics of the invention. They are provided herein for illustrative purposes only and are not meant as limitations of the invention, which is fully set forth in the claims and in the foregoing description.

EXAMPLE 1

A fire retardant material for treating luaun plywood panels was prepared using the following general procedure.

A mixture of 85% orthophosphoric acid and water is placed in a reactor vessel. Propylene oxide as a neat liquid is dripped into the aqueous phosphoric acid solution over a period of about 20 minutes. The exothermic reaction which develops is cooled by a water bath. After the addition is complete, the reaction solution is neutralized to a pH of 6.8 with 30% ammonium hydroxide and water is added to the reaction solution to yield a solution having a final solids content of 40%. The resulting fire retardant material has 0.1 mole of propylene oxide per mole of phosphoric acid.

EXAMPLES 2-5

The fire retardant material of Example 1 was admixed with varying amounts of sodium borate ($Na_2B_4O_7$) as shown in Table 1.

TABLE 1

| Component | Amount (Parts by Weight) | | | |
|---|---|---|---|---|
| | Example 2 | Example 3 | Example 4 | Example 5 |
| Fire Retardant | 100 | 100 | 100 | 100 |
| $Na_2B_4O_7$ | 0 | 1 | 2 | 3 |

6"×6" luaun plywood panels, each 3.6mm thick, were immersed in each of the above treating solutions for 5 min. Each panel was then wiped dry with a squeegie and immediately placed in a circulating hot air oven set at 130° C. After 10 minutes, the panels were removed and cooled, and the surfaces were visually inspected. The following observations were made:

Example 2: Surface appeared entirely covered with salt deposits and blisters.
Example 3: Some blisters were present, but appeared less concentrated than in Example 2.
Example 4: No blisters were evident, but there were some whitish salt deposits.
Example 5: No blisters were evident. Only a faint trace of salts appeared on the surface.

EXAMPLES 6-10

The fire retardant material of Example 1 was again admixed with varying amounts of boric acid ($H_3BO_3$) and sodium borate ($Na_2B_4O_7$) as shown in Table 2.

TABLE 2

| Component | Amount (Parts by Weight) | | | | |
|---|---|---|---|---|---|
| | Ex. 6 | Ex. 7 | Ex. 8 | Ex. 9 | Ex. 10 |
| Fire Retardant | 100 | 100 | 100 | 100 | 100 |
| $H_3BO_3$ | 0 | 1 | 2 | 3 | — |
| $Na_2B_4O_7$ | — | — | — | — | 3 |

6"×6" luaun panels, each 3.6mm thick, were immersed in each of the above solutions for 5 minutes. Each was then wiped dry with a squeegie and additionally blotted with paper towels to remove some liquid remaining in the "valleys". Drying was effected at 130° C. for 10 minutes. The surfaces were then visually inspected and the following observations were made:

Example 6: A high concentration of blisters, but somewhat less than in Example 2.
Example 7: Fewer blisters than in Example 6.
Example 8: No blisters. A trace of salt deposits.
Example 9: No blisters and no salt deposits.
Example 10: No blisters and no salt deposits.

EXAMPLES 11-14

The fire retardant material of Example 1 was again admixed with varying amounts of sodium borate as shown in Table 3.

TABLE 3

| | Amounts (Parts by Weight) | | | |
|---|---|---|---|---|
| | Example 11 | Example 12 | Example 13 | Example 14 |
| Fire Retardant | 100 | 100 | 100 | 100 |
| $Na_2B_4O_7$ | 0 | 1 | 2 | 3 |

Four 6"×6" luaun panels, each 3.6 mm thick, were pre-heated to 110° C. The face veneer of each panel was then immediately flooded with an excess of the flame retardant solutions of Examples 11-14. Five seconds after flooding, the excess liquid was removed by a rubber squeegie. By weighing the panels before and after treatment, it was determined that the phosphorus levels were in the range 12 to 14 g/square meter.

The wet panels were then immediately placed in an air circulating oven at 120° C. for one minute. The surfaces were then visually inspected and the following observations were made:

Example 11: A high concentration of blisters over all the surface.
Example 12: Lower concentration of blisters than in Example 11.
Example 13: No blisters were evident, but there were some minor salt deposits.
Example 14: No blisters or salt deposits were evident.

Although various embodiments of this invention have been shown and described in the specification, it is intended that the invention be liberally construed and not limited thereby. It is to be understood, therefore, that the appended claims are intended to cover all modifications and variations which are within the spirit and scope of the present invention.

What is claimed is:

1. A non-blooming fire retardant composition for celulosic material consisting essentially of
   (1) a reaction mixture formed from aqueous phosphoric acid and an alkylene oxide of 2 to 4 carbon atoms, the weight ratio of oxide to acid being within the range of about 0.01:1 to about 0.25:1, such ratio being based upon the weight of 100 percent phosphoric acid or equivalent thereof, and
   (2) from about 2.5% to about 12% by weight of boric acid on a solids basis.

2. The composition of claim 1 wherein the cellulosic material is a ligno cellulosic material.

3. The composition of claim 2 wherein the ligno cellulosic material is wood.

4. The composition of claim 1 wherein the phosphoric acid is orthophosphoric acid.

5. The composition of claim 4 wherein the alkylene oxide is propylene oxide.

6. The composition of claim 1 wherein the boric acid is present in an amount of from about 5% to about 7.5% by weight on a solids basis.

7. A non-blooming fire retardant composition for cellulosic material consisting essentially of
(1) a reaction mixture formed from aqueous phosphoric acid and an alkylene oxide of 2 to 4 carbon atoms, the weight ration of oxide to acid being within the range of about 0.01:1 to about 0.25:1, such ratio being based upon the weight of 100 percent phosphoric acid or equivalent thereof, and
(2) from about 2.5% to about 12% by weight of an alkali metal borate on a solids basis.

8. The composition of claim 7 wherein the cellulosic material is a ligno celulosic material.

9. The composition of claim 8 wherein the ligno cellulosic material is wood.

10. The composition of claim 7 wherein the phosphoric acid is orthophosphoric acid.

11. The composition of claim 10 wherein the alkylene oxide is propylene oxide.

12. The composition of claim 7 wherein the alkali metal borate is sodium borate.

13. The composition of claim 7 wherein the alkali metal borate is present in an amount of from about 5% to about 7.5% by weight on a solids basis.

* * * * *